US011971903B2

(12) United States Patent
Grant et al.

(10) Patent No.: US 11,971,903 B2
(45) Date of Patent: Apr. 30, 2024

(54) ATOMICALLY BRIDGING TRANSACTIONS ACROSS DIFFERENT BLOCKCHAINS

(71) Applicant: Circle Internet Financial, Inc., Boston, MA (US)

(72) Inventors: Michael Grant, Walpole, MA (US); Marcus Boorstin, Cambridge, MA (US); Rachel Marison, Honolulu, HI (US)

(73) Assignee: Circle Internet Financial Limited, Dublin (IE)

( * ) Notice: Subject to any disclaimer, the term of this patent is extended or adjusted under 35 U.S.C. 154(b) by 71 days.

(21) Appl. No.: 17/744,344

(22) Filed: May 13, 2022

(65) Prior Publication Data

US 2023/0367788 A1    Nov. 16, 2023

(51) Int. Cl.
*G06F 16/00* (2019.01)
*G06F 16/27* (2019.01)

(52) U.S. Cl.
CPC ..................... *G06F 16/27* (2019.01)

(58) Field of Classification Search
CPC ...................................................... G06F 16/27
See application file for complete search history.

(56) References Cited

U.S. PATENT DOCUMENTS

| | | | | |
|---|---|---|---|---|
| 11,496,327 | B1* | 11/2022 | Kaplan | G06Q 20/3674 |
| 11,544,787 | B2* | 1/2023 | Yang | H04L 9/0637 |
| 11,588,643 | B2* | 2/2023 | Maniyar | H04L 9/3236 |
| 11,669,830 | B2* | 6/2023 | Margolis | G06Q 40/04 |
| | | | | 705/41 |
| 2019/0370807 | A1* | 12/2019 | Hu | G06Q 20/10 |
| 2021/0065070 | A1* | 3/2021 | Augustine | H04L 9/0643 |

(Continued)

FOREIGN PATENT DOCUMENTS

| | | |
|---|---|---|
| CN | 110650189 A | 1/2020 |
| WO | 2022075046 A1 | 4/2022 |

OTHER PUBLICATIONS

Zakhary et al.,"Atomic Commitment Across Blockchains",2019,arXiv,v2,pp. 1-20 (Year: 2019).*

(Continued)

*Primary Examiner* — Alexander Khong
(74) *Attorney, Agent, or Firm* — Patterson + Sheridan, LLP (57) ABSTRACT

Certain aspects of the present disclosure provide techniques for bridging transactions across blockchains. The method generally includes receiving a request to invoke an atomic transaction including operations performed on a first blockchain and operations performed on a second blockchain. Generally, the atomic transaction is completed when an enumerated set of operations are completed. A first operation in the enumerated set of operations is initiated on the first blockchain. Initiating the first operation on the first blockchain triggers initiation of one or more second operations on the second blockchain. Completion of the one or more second operations for the atomic transaction is detected on the second blockchain, indicating that the operations of the atomic transaction relevant to the second blockchain have been completed on the second blockchain. Based on detecting completion of the one or more second operations on the second blockchain, the atomic transaction is finalized on the first blockchain.

20 Claims, 5 Drawing Sheets

(56) References Cited

U.S. PATENT DOCUMENTS

| | | | |
|---|---|---|---|
| 2021/0073913 A1* | 3/2021 | Ingargiola | H04L 67/104 |
| 2022/0114584 A1* | 4/2022 | Conley | G06Q 20/3674 |
| 2022/0405742 A1* | 12/2022 | Ravinathan | G06Q 20/3827 |
| 2023/0146197 A1* | 5/2023 | Raman | G06F 16/1873 |
| | | | 704/9 |

OTHER PUBLICATIONS

Yue Li, et al., Polybridge: A Crosschain Bridge for Heterogeneous Blockchains, 978-1-6654-9538, 2002 IEEE, 2 pages, Year: 2022.
How to Use the Polygon Bridge, Binance Academy, https://academy.binance.com/en/articles/how-to-use-the-polygon-bridge, 53 pages, Year: 2022.
PCT/US2023/017779, International Search Report and Written Opinion dated Jun. 28, 2023, 14 pages.

* cited by examiner

ATOMICALLY BRIDGING TRANSACTIONS ACROSS DIFFERENT BLOCKCHAINS

INTRODUCTION

Aspects of the present disclosure relate to transaction processing in blockchain systems to improve processing and resource utilization efficiency.

BACKGROUND

Blockchains can be used in various decentralized systems to provide a ledger of transactions that have occurred within these decentralized systems. Generally, a blockchain may include a chain of blocks, in which latest block includes some information about a transaction that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail.

In some cases, transactions may be recorded on multiple blockchains. For example, a transaction may be initially recorded on a first blockchain and then transferred, or "bridged", to a second blockchain. Generally, the process of recording a transaction on a first blockchain and bridging the transaction to a second blockchain may be executed as a series of asynchronous, independent, transactions involving multiple parties. Because bridging a transaction from a first blockchain to a second blockchain generally involves multiple independent transactions, the processing cost of the overall bridging transaction and the risk of a transaction failure may be increased. For example, a transaction may be partially completed, leaving the system in an inconsistent state (e.g., where the first blockchain includes a record of a transaction, but the second blockchain does not include a corresponding record or only includes a partial record that does not complete the bridging process). Further, the use of multiple independent transactions may require coordination across different parties in order to complete the transaction and may impose significant processing overheads in generating and processing overhead messages within a blockchain system.

Accordingly, techniques are needed to allow for efficient processing of transactions bridged across multiple blockchains.

BRIEF SUMMARY

Certain embodiments provide a computer-implemented method for bridging transactions across blockchains. The method generally includes receiving a request to invoke an atomic transaction including operations performed on a first blockchain and operations performed on a second blockchain. Generally, the atomic transaction is completed when an enumerated set of operations are completed. A first operation for the atomic transaction in the enumerated set of operations is initiated on the first blockchain. Initiating the first operation on the first blockchain triggers initiation of one or more second operations for the atomic transaction on the second blockchain. Completion of the one or more second operations for the atomic transaction is detected on the second blockchain, indicating that the operations of the atomic transaction relevant to the second blockchain have been completed on the second blockchain. Based on detecting completion of the one or more second operations on the second blockchain, the atomic transaction is finalized on the first blockchain.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Transactions in cryptocurrency systems may be represented as blocks in a blockchain that track a universe of transactions performed using the cryptocurrency system. In these cryptocurrency systems, processed transactions may not be modified at a later date, thus providing an immutable ledger of the transactions performed using the cryptocurrency system.

In some cases, multiple blockchains can be used to record a transaction. A base blockchain, also referred to as a "Layer 1" blockchain, may be a blockchain such as ETHEREUM®, and a blockchain that is "overlaid" on the Layer 1 blockchain, or otherwise configured to work alongside the Layer 1 blockchain, may be referred to as a "Layer 2" blockchain. An example of a Layer 2 blockchain may include the POLYGON® chain. Layer 1 blockchains generally provide a source of truth for a network and may generally be responsible for handling transactions on the Layer 1 blockchain and the Layer 2 blockchain(s) overlaid on the Layer 1 blockchain. Layer 2 blockchains generally allow for various applications to be built on top of a Layer 1 blockchain to extend the functionality of the Layer 1 blockchain, and to extend the functionality of the overall blockchain-based system. However, to maintain consistency between the Layer 1 blockchain and the Layer 2 blockchain(s), various transactions may be committed to both the Layer 1 blockchain and the Layer 2 blockchain(s).

For example, a Layer 1 blockchain may be used to mint tokens, such as cryptocurrency tokens, that may be spent and maintained on the Layer 2 blockchain. To maintain consistency between the Layer 1 blockchain and the Layer 2 blockchain, minted tokens may be recorded on both the Layer 1 blockchain and the Layer 2 blockchain. Subsequent transactions that use, but do not destroy, these tokens may be performed on the Layer 2 blockchain, which generally allows for transaction processing to be offloaded from the Layer 1 blockchain to the Layer 2 blockchain and thus reduces the amount of compute resources needed to process transactions on the Layer 1 blockchain. When a token is to be destroyed (or "burned"), the tokens may be destroyed on both the Layer 1 and the Layer 2 blockchains in order to maintain consistency between the records on each blockchain.

In order to maintain consistency across the Layer 1 and Layer 2 blockchains, transactions may be bridged across these blockchains so that, for example, the number of extant tokens recorded in the Layer 1 blockchain matches the number of extant tokens on the Layer 2 blockchain. As discussed, this bridging generally involves multiple independent transactions. However, these transactions are generally considered independent transactions that lack atomicity: that is, these transactions are independent that succeed or fail independently instead of being part of an atomic transaction that is completed only when all of the operations in the set of operations succeed and fails if any single operation in the set of operations fail to complete. Thus, failure of a transaction on one blockchain may not cause the entire series of transactions involved in the bridging operation to fail. Thus, a bridging transaction may end up in a partially complete state, leading to inconsistency between the records stored on the Layer 1 and Layer 2 blockchains.

Aspects of the present disclosure provide techniques for atomically bridging transactions across different blockchains. Generally, an atomic transaction may be defined as a set of operations performed on a first blockchain and a series of operations performed on a second blockchain, with completion of the atomic transaction being an all-or-nothing proposition. The atomic transaction may be executed by initiating a first operation for the atomic operation on the first blockchain, which thereby triggers execution of operations on the second blockchain. When the operations on the second blockchain are completed, the atomic transaction may be finalized on the first blockchain, thus leaving the first blockchain and the second blockchain in a consistent state. By doing so, transactions across different blockchains may be processed more efficiently, as transactions on the first and second blockchains may be automatically triggered according to a definition for the atomic transaction. This may reduce the amount of time, processing resources, memory, and energy used in processing blocks in these blockchains and finalizing transactions recorded across these blockchains. Because processing blocks in a blockchain is generally a resource-intensive process that has high energy use, aspects of the present disclosure may reduce the amount of energy used in performing transactions across different blockchains, which may reduce the environmental impacts of executing transactions across these different blockchains. Further, because the set of operations involved in bridging a transaction across different blockchains is defined as an atomic transaction in which each of the operations must be performed in order to complete the atomic transaction, consistency may be maintained across the blockchains. Failure of an operation on one blockchain may generally cause the entire atomic transaction to fail, thus minimizing the risk that the first blockchain and the second blockchain are left in inconsistent states.

Figure 1:
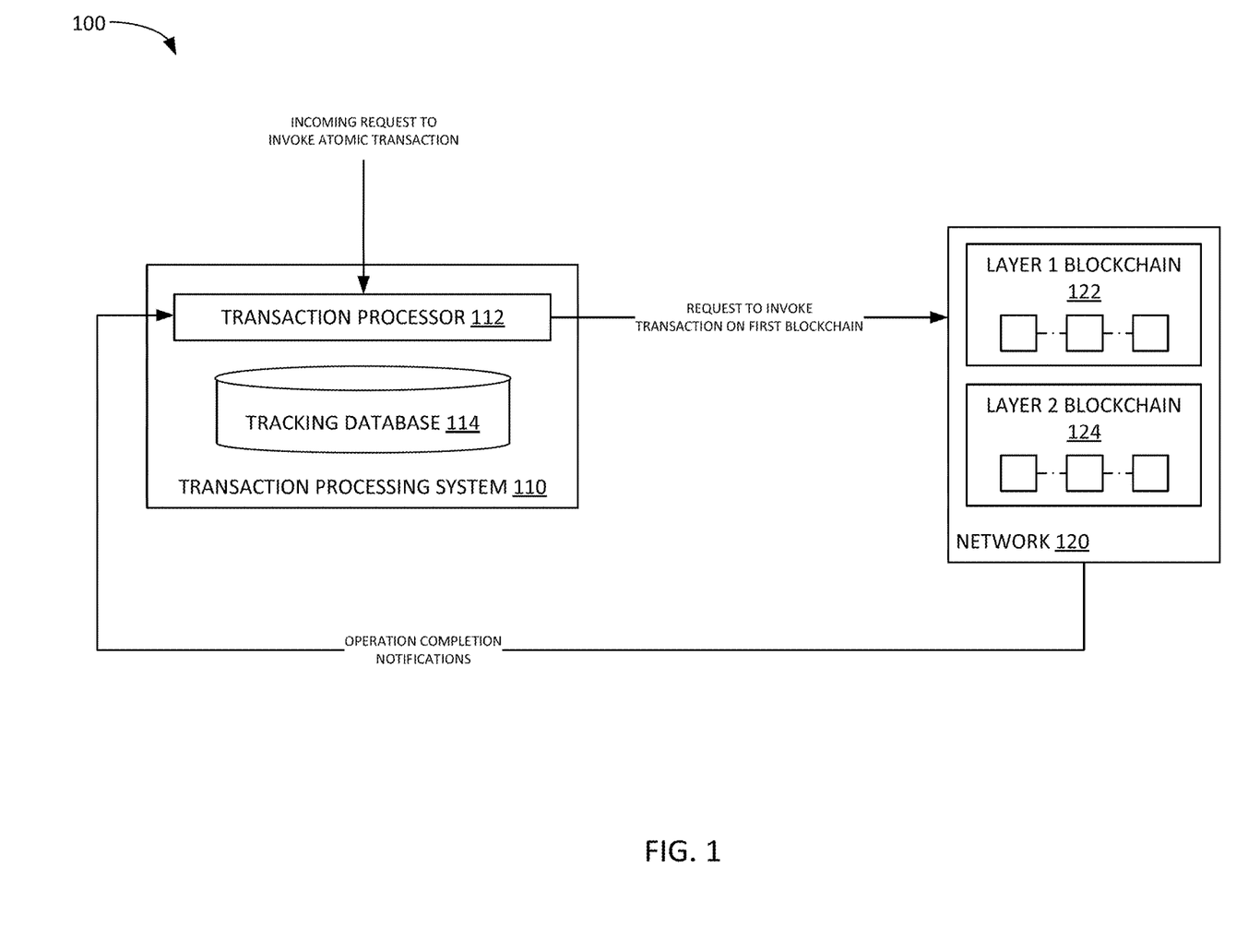
FIG. 1 depicts an example computing system for bridging a transaction across a first blockchain and a second blockchain using atomic transactions.

Example Atomic Transaction Bridging Across a First Blockchain and a Second Blockchain FIG. 1 illustrates an example computing environment 100 in which transactions are bridged from a first blockchain to a second blockchain using atomic transactions. As illustrated, computing environment 100 includes a transaction processing system 110 and a network 120.

Transaction processing system 110 generally receives a request to perform a transaction bridged across a first blockchain and a second blockchain and invokes, atomically, the transaction on the first blockchain and second blockchain to commit the transaction to both the first and the second blockchains. Generally, transaction processing system 110 may be any computing device that can process blocks in a blockchain, such as a server, a compute cluster, desktop computers, laptop computers, or the like. It should be understood that transaction processing system 110 may be distributed across multiple computing devices and may be executed as one or more cloud-based services, such as virtual machines or containers hosted on one or more physical computing systems. Transaction processing system 110 is generally configured to process transactions for a cryptocurrency network, such as network 120. By way of example, network 120 may be a network such as ALGORAND', BITCOIN™, ETHEREUM®, SOLANA™, STELLAR™, TRON™, and other cryptocurrency networks on which transactions can be bridged to a Level 2 blockchain overlaid on these cryptocurrency networks.

As illustrated, transaction processing system 110 includes a transaction processor 112 and a tracking database 114. Generally, transaction processor 112 monitors Layer 1 blockchain 122 and Layer 2 blockchain 124 for the processing of the operations defined for an atomic transaction to bridge transactions across Layer 1 blockchain 122 and Layer 2 blockchain 124 based on records included in tracking database 114. It should be noted that while FIG. 1 illustrates interactions between transaction processing system 110, a single Layer 1 blockchain, and a single Layer 2 blockchain, transaction processing system 110 may interact with multiple Layer 1 blockchains and/or multiple Layer 2 blockchains.

Generally, transaction processor 112 receives a request to invoke an atomic transaction, which may be a transaction including an enumerated set of operations (e.g., defined in a smart contract), that is bridged across Layer 1 blockchain 122 and Layer 2 blockchain 124 in this example. By way of example, an atomic transaction may include a transaction to mint tokens on Layer 1 blockchain 122 and Layer 2 blockchain 124 or a transaction to burn (or destroy) tokens on Layer 1 blockchain 122 and Layer 2 blockchain 124. An atomic transaction may also include transactions that are recorded on multiple blockchains and include a plurality of operations that are required to be executed in order for the atomic transaction to be completed. Generally, a token represents an asset for which a transaction history is maintained on one or more blockchains. In some aspects, the tokens discussed herein may include cryptocurrency tokens, stablecoin tokens (e.g., cryptocurrency tokens linked to fiat currency), or other digital assets.

Upon receipt of the request to invoke an atomic transaction, transaction processor 112 invokes a first transaction in the enumerated set of operations on a first blockchain, which then triggers execution of operations on the first blockchain and corresponding operations on the second blockchain. Where the first operation is executed on Layer 1 blockchain 122, the second blockchain on which corresponding operations are executed is Layer 2 blockchain 124; likewise, where the first operation is executed on Layer 2 blockchain 124, the second blockchain on which corresponding operations are executed is Layer 1 blockchain 122. When the operations defined for the atomic operation on the second blockchain are completed, transaction processor 112 finalizes the atomic transaction on the first blockchain. Because the atomic transaction is generally not considered complete until each operation for the atomic transaction is successfully completed, finalizing the atomic transaction on the first blockchain upon detecting that the operations on the second blockchain are completed may ensure that consistency is maintained across the first blockchain and second blockchain.

In some aspects, transaction processor 112 maintains records in a tracking database 114 that tracks operations across Layer 1 blockchain 122 and Layer 2 blockchain 124 to monitor the progress of an atomic transaction across Layer 1 blockchain 122 and Layer 2 blockchain 124. When transaction processor 112 initiates a first operation for the atomic transaction on the first blockchain, which may be an initial operation defined in the enumerated set of operations for the atomic transaction, transaction processor 112 can generate a record in tracking database 114 including the parameters of the first operation, an identifier of the first operation, and an indication that the first operation is waiting for completion of one or more second operations. Examples of records maintained in tracking database 114 are illustrated below in Tables 1 through 8. Subsequent entries in tracking database 114, for subsequent operations performed on either Layer 1 blockchain 122 or Layer 2 blockchain 124, may reference another transaction in tracking database 114 (e.g., based at least on the identifier assigned to any given operation). When each operation in the enumerated set of transactions is marked complete, the atomic transaction may be deemed complete.

Generally, to maintain the records in tracking database 114 tracking operations for an atomic transaction across Layer 1 blockchain 122 and Layer 2 blockchain 124, transaction processor 112 monitors for information related to specific operations on Layer 1 blockchain 122 and Layer 2 blockchain 124. For example, transaction processor 112 can actively monitor the records maintained on Layer 1 blockchain 122 and Layer 2 blockchain 124 or can listen for messaging emitted by Layer 1 blockchain 122 and Layer 2 blockchain 124 referencing specific operations invoked on these blockchains. As transaction processor 112 receives messaging from Layer 1 blockchain 122 and/or Layer 2 blockchain 124 confirming that an operation has been processed, transaction processor 112 can update the appropriate records in tracking database 114 to reflect that an operation pending completion is now completed and work backwards to finalize, confirm, and complete related transactions. For example, if a record for a first operation references a second operation as a related operation, and transaction processor 112 receives messaging from Layer 1 blockchain 122 and/or Layer 2 blockchain 124 confirming completion of the second operation, transaction processor 112 generally uses the information about the second operation to determine whether the first operation is in condition for finalization. If the first operation is in condition for finalization (e.g., is not waiting for other operations to be completed), transaction processor 112 initiates a finalization and confirmation process for the first operation on the appropriate blockchain and, after receiving confirmation that a record has been persisted to the appropriate blockchain evidencing completion of the first operation, marks the first operation as completed in tracking database 114.

For example, an atomic transaction to mint tokens on Layer 1 blockchain 122 and Layer 2 blockchain 124 may include a set of four operations: a first operation to mint the tokens on Layer 1 blockchain 122, a second transaction to bridge the minted tokens onto Layer 2 blockchain 124, a third transaction to deposit the tokens onto Layer 2 blockchain 124, and a fourth transaction to "sweep" the minted tokens into a specific account managed on Layer 2 blockchain 124. In this example, the "mint" operation may be deemed to only be completed when the bridge, sweep, and deposit transactions are also completed. Thus, when the mint transaction is initiated, an entry in tracking database 114 may reflect that the mint transaction has been initiated with parameters unique to the mint transaction and an indication that the mint transaction is awaiting completion of one or more other related transactions (e.g., as defined by a smart contract or other enumeration of operations for an atomic transaction). An example entry in tracking database 114 for the mint transaction is illustrated below in Table 1:

TABLE 1

| Ref_ID | Related_Ref_ID | Activity | Amt | To_addr | From_addr | State | Metadata |
|---|---|---|---|---|---|---|---|
| 1 | | Mint | 10 | 0x123 | 0x456 | Waiting | requireRelatedTxCompletion: true |

As illustrated in Table 1, the mint transaction has the ID "1", with a specified amount and address parameters, an indication that the mint transaction is in a waiting state, and an indication that the mint transaction requires completion of related transactions to be completed. Based on this indication, transaction processing system 110 places the transaction in a waiting state and listens for one or more messages from Layer 1 blockchain 122 and/or Layer 2 blockchain 124 referencing the mint transaction (e.g., including an ID of "1") to determine when the atomic transaction is completed.

At a subsequent point in time, transaction processing system 110 receives a message referencing the mint transaction indicating that operation related to the mint transaction is to be processed on Layer 1 blockchain 122 and/or Layer 2 blockchain 124. In this example, according to the enumerated set of operations, the next operation to be processed is the bridging operation to bridge the minted tokens from Layer 1 blockchain 122 to Layer 2 blockchain 124. To bridge the mint transaction from Layer 1 blockchain 122 to Layer 2 blockchain 124, transaction processor 112 can retrieve a deposit contract for the owner of the address to which the tokens are to be minted (e.g., the owner of address 0x123) and invoke a bridging operation on Layer 1 blockchain 122 with the address of the deposit contract. Subsequently, tracking database 114 will include two entries: one for the mint transaction on Layer 1 blockchain 122 and one for the bridge transaction across Layer 1 blockchain 122 and Layer 2 blockchain 124, as illustrated below in Table 2:

TABLE 2

| Ref_ID | Related_Ref_ID | Activity | Amt | To_addr | From_addr | State | Metadata |
|---|---|---|---|---|---|---|---|
| 1 | 2 | Mint | 10 | 0x123 | 0x456 | Waiting | requireRelatedTxCompletion: true |
| 2 | | Bridge | 10 | 0x789 | 0x456 | Waiting | requireRelatedTxCompletion: true |

After the second transaction (e.g., the transaction with reference ID "2" is broadcast to Layer 1 blockchain 122 and confirmed on Layer 1 blockchain, transaction processing system 110 can place the second transaction in a waiting state and listen for a message including the ID "03df0904-24" to determine when the related transaction(s) for the second transaction are completed on one or both of Layer 1 blockchain 122 and Layer 2 blockchain 124. Meanwhile, an event listener associated with Layer 1 blockchain 122 and Layer 2 blockchain can determine that a bridging operation has been pushed to Layer 1 blockchain 122 and invoke the corresponding deposit operation on Layer 2 blockchain 124 to generate a corresponding record that adds the minted tokens to Layer 2 blockchain. In this example, the deposit operation mints the corresponding tokens on Layer 2 blockchain and deposits the minted tokens on Layer 2 blockchain (e.g., in a global account). After confirmation, Layer 2 blockchain 124 can broadcast that the deposit transaction has been completed, and transaction processor 112 generates a corresponding record in tracking database 114. Thus, tracking database 114 will include the following entries as illustrated in Table 3:

TABLE 3

| Ref_ID | Related_Ref_ID | Activity | Amt | To_addr | From_addr | State | Metadata |
|---|---|---|---|---|---|---|---|
| 1 | 2 | Mint | 10 | 0x123 | 0x456 | Waiting | requireRelatedTxCompletion: true |
| 2 | | Bridge | 10 | 0x789 | 0x456 | Waiting | requireRelatedTxCompletion: true |
| 3 | | Deposit | 10 | 0x789 | 0x456 | Complete | |

Based on the deposit transaction evidenced in Table 3 above, transaction processor 112 can subsequently invoke the fourth transaction (e.g., the sweep operation) to move the tokens deposited onto Layer 2 blockchain 124 into the appropriate wallet in Layer 2 blockchain. In this example, the sweep transaction may thus move the tokens deposited to address 0x789 to a wallet associated with address 0x123 (e.g., the initial recipient address, as illustrated in the record for the first (mint) transaction). After initiating and completing the sweep transaction, tracking database 114 will include four entries, corresponding to the four operations defined for the atomic mint transaction, as illustrated below in Table 4:

To complete the atomic transaction, transaction processor 112 receives a message from Layer 2 blockchain 124 indicating that the sweep operation (e.g., as illustrated above, the operation with reference ID "12b91791") is completed. Based on the related reference ID in the sweep transaction record, transaction processor 112 examines the records in tracking database 114 to identify a transaction record with matching destination addresses and amounts. In this example, thus, transaction processor 112 searches the records in tracking database 114 to identify a transaction record with the same destination address (e.g., the same value in the "To_addr" field) and amount (e.g., the same value in the "Amt" field) as that included in the transaction

TABLE 4

| Ref_ID | Related_Ref_ID | Activity | Amt | To_addr | From_addr | State | Metadata |
|---|---|---|---|---|---|---|---|
| 1 | 2 | Mint | 10 | 0x123 | 0x456 | Waiting | requireRelatedTxCompletion: true |
| 2 | | Bridge | 10 | 0x789 | 0x456 | Waiting | requireRelatedTxCompletion: true |
| 3 | 4 | Sweep | 10 | 0x123 | 0x789 | Complete | |
| 4 | | Deposit | 10 | 0x789 | 0x456 | Complete | | record for the transaction with reference ID "4" (the deposit transaction illustrated in Table 4 above). Because the bridge transaction includes the same destination address and amount as the deposit transaction, transaction processor 112 can determine that the bridge transaction is waiting for completion of the deposit transaction and update tracking database 114 to reflect the updated association and move the bridge transaction to a completed state. Table 5 illustrates the records in tracking database 114 after the bridge transaction is updated and marked as completed:

TABLE 5

| Ref_ID | Related_Ref_ID | Activity | Amt | To_addr | From_addr | State | Metadata |
| --- | --- | --- | --- | --- | --- | --- | --- |
| 1 | 2 | Mint | 10 | 0x123 | 0x456 | Waiting | requireRelatedTxCompletion: true |
| 2 | 3 | Bridge | 10 | 0x789 | 0x456 | Complete | requireRelatedTxCompletion: true |
| 3 | 4 | Sweep | 10 | 0x123 | 0x789 | Complete | |
| 4 | | Deposit | 10 | 0x789 | 0x456 | Complete | |

After the bridge transaction is confirmed at Layer 1 blockchain 122 and marked as completed, transaction processor 112 then examines tracking database 114 to identify a transaction in a waiting state that references the bridge transaction. The identified transaction is then finalized at the appropriate blockchain (e.g., for the mint transaction, at the Layer 1 blockchain), and the atomic operation is deemed completed. In this example, transaction processor 112 completes the mint transaction and sets the state of the mint transaction in tracking database 114 to complete.

In another example, an atomic transaction may be defined to burn, or destroy, previously minted tokens on Layer 1 blockchain 122 and Layer 2 blockchain 124. The enumerated set of operations for the burn atomic transaction includes a first operation to burn the tokens on Layer 2 blockchain 124 and a second operation to unbridge the burned tokens from Layer 1 blockchain 122. The burn operation on Layer 2 blockchain 124 may thus be treated as an operation that can be completed only after the unbridge operation on Layer 1 blockchain 122 is completed. Thus, when the burn transaction is executed and confirmed on Layer 2 blockchain 124, an entry in tracking database 114 may reflect that the burn transaction has been initiated with parameters unique to the burn transaction and an indication that the burn transaction is awaiting completion of one or more other related transactions (e.g., as defined by a smart contract or other enumeration of operations for an atomic transaction). An example entry in tracking database 114 for the mint transaction is illustrated below in Table 6:

TABLE 6

| Ref_ID | Related_Ref_ID | Activity | Amt | To_addr | From_addr | State | Metadata |
| --- | --- | --- | --- | --- | --- | --- | --- |
| 5 | | Burn | 10 | | 0x456 | Waiting | requireRelatedTxCompletion: true |

Because the burn operation includes information indicating that completion of the burn operation requires completion of a related transaction, transaction processor 112 then waits for completion of an operation referencing the burn operation before completing the burn operation. Subsequently, according to an enumeration of operations for the atomic burn transaction, an unbridge operation is invoked on Layer 1 blockchain 122 (e.g., by operation of a smart contract executing across Layer 1 blockchain 122 and Layer 2 blockchain 124). To unbridge the tokens from the Layer 1 blockchain, transaction processor 112 can generate a checkpoint at Layer 1 blockchain 122 and obtain proof from Layer 2 blockchain 124 that the tokens have been burned on Layer 2 blockchain 124. After transaction processor 112 receives proof and confirms that the tokens have been burned on Layer 2 blockchain 124, transaction processor 112 invokes the unbridge operation on Layer 1 blockchain 122, inserts a corresponding record into tracking database 114, and sets the related reference ID of the burn operation to the reference ID of the unbridge operation. After the unbridge operation is confirmed and completed, tracking database 114 includes the entries illustrated below in Table 7:

TABLE 7

| Ref_ID | Related_Ref_ID | Activity | Amt | To_addr | From_addr | State | Metadata |
|---|---|---|---|---|---|---|---|
| 5 | 6 | Burn | 10 | | 0x456 | Waiting | requireRelatedTxCompletion: true |
| 6 | | Unbridge | 10 | | 0x456 | Complete | childBurnerAddress: 0x678; proofOfBurn: '. . .' |

Subsequently, transaction processor 112 receives a message from Layer 1 blockchain 122 indicating that the unbridge operation is complete. Based on receiving this message, transaction processor 112 searches tracking database 114 for an operation with a related reference ID matching the reference ID of the unbridge operation (in this case, the burn operation with reference ID "5"). Transaction processor 112 subsequently initiates a completion process for the burn operation to commit and confirm the burn operation on Layer 2 blockchain 124, and upon receiving confirmation from Layer 2 blockchain 124 that the burn operation is completed, updates tracking database 114. The final state for tracking database 114 after completion of the atomic burn transaction is illustrated below in Table 8:

TABLE 8

| Ref_ID | Related_Ref_ID | Activity | Amt | To_addr | From_addr | State | Metadata |
|---|---|---|---|---|---|---|---|
| 5 | 6 | Burn | 10 | | 0x456 | Complete | requireRelatedTxCompletion: true |
| 6 | | Unbridge | 10 | | 0x456 | Complete | childBurnerAddress: 0x678; proofOfBurn: '. . .' |

Using the techniques discussed above, the initial operation for an atomic transaction is not confirmed and completed until each of the other operations defined in an enumerated set of operations for the atomic transaction are also completed. The enumerated set of operations may be defined a priori and stored, for example, as a smart contract defined on one or both of Layer 1 blockchain 122 and Layer 2 blockchain 124 that automatically executes a series of operations when invoked, programmatically defined in transaction processor 112, or the like. Because the initial operation for the atomic transaction is placed in a waiting state and only confirmed and completed on the appropriate blockchain after the other operations defined in the enumerated set of operations for the atomic transaction are completed, aspects of the present disclosure guarantee atomicity of an operation involving actions performed on both Layer 1 blockchain 122 and Layer 2 blockchain 124. Thus, operations on both Layer 1 blockchain 122 and Layer 2 blockchain 124 can be performed automatically and deemed part of an atomic transaction, which may reduce transaction overhead, time, and other resource utilization (e.g., "gas" fees charged to perform a transaction on Layer 1 blockchain 122 or other transaction fees in network 120) involved in bridging a transaction from a first blockchain to a second blockchain. First, because the enumerated set of operations is executed automatically by transaction processor 112 instead of being executed by different, independent, systems, the messaging overhead involved in coordinating operations across these independent systems may be reduced or minimized (e.g., through the minimization or elimination of messaging across different systems to trigger execution of related operations). Second, the reliability of computing systems on which these operations are executed may be improved, as automatically executing the enumerated set of operations may reduce the likelihood that messages to trigger execution of related operations are lost in transit between the different systems involved in bridging a transaction across different blockchains. Third, because the blockchains across which transactions are bridged are guaranteed to be consistent with each other after completion of an atomic transaction executed across these blockchains, process cycles and other compute resources need not be used to confirm whether the records for a transaction bridged across blockchains are consistent.

It should be recognized that the techniques discussed herein may be used to define a series of operations as an atomic transaction across any number of blockchains. Further, while the token burning and token minting operations discussed above are illustrative of atomic transactions that may be performed across different blockchains, it should be recognized that the techniques discussed herein may be used to define any sort of transaction across different blockchains for which atomicity is desired (e.g., where a transaction should be defined as an all-or-nothing operation where the transaction is completed only when all of the operations defined for the transaction are completed and where the transaction fails when any one operation fails to execute).

Example Transaction Bridging Using Atomic Transactions

Figure 2:
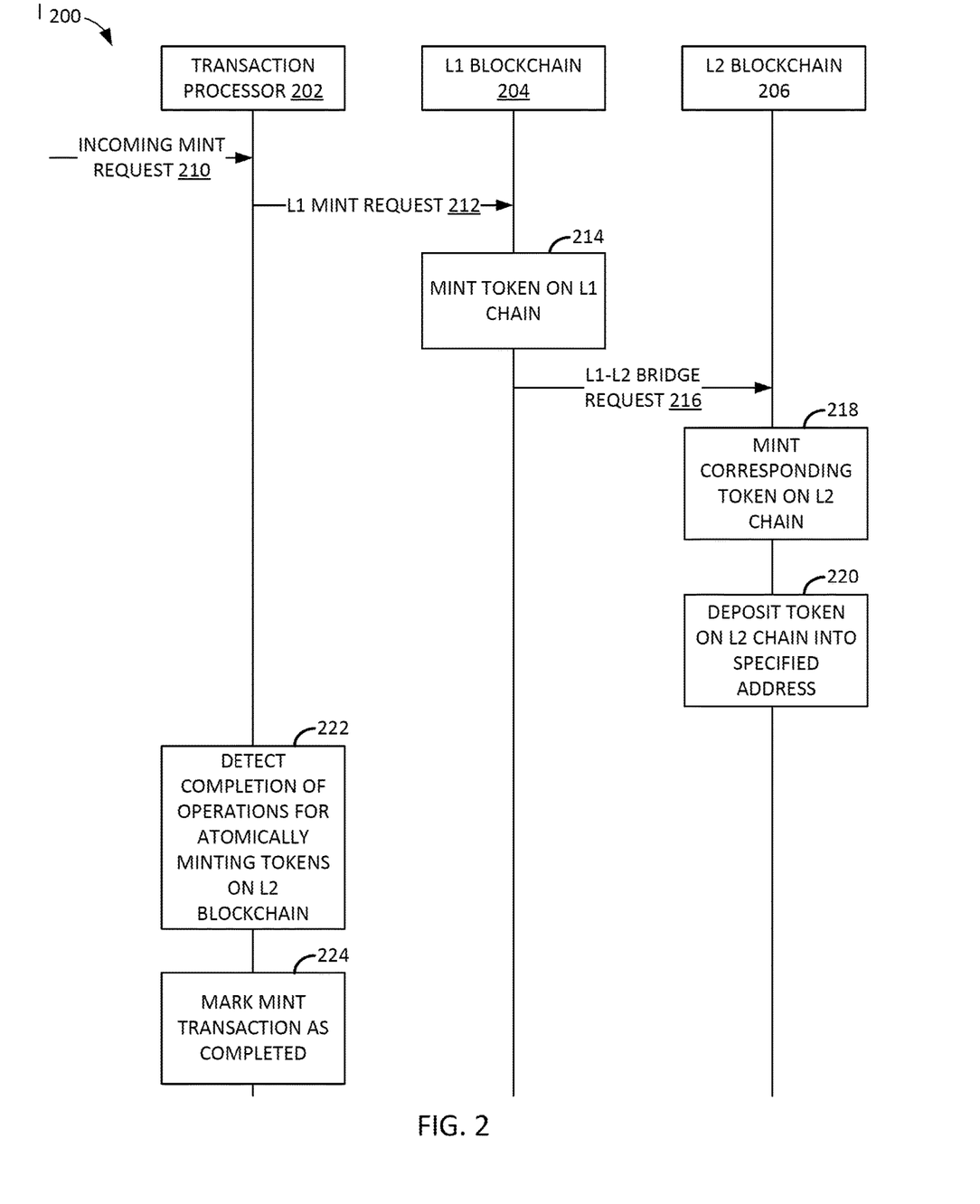
FIG. 2 is a message flow diagram illustrating messages exchanged between a transaction processor, a first blockchain, and a second blockchain for executing an atomic token minting operation that bridges tokens minted on the first blockchain to the second blockchain.

FIG. 2 is a message flow diagram 200 illustrating messages exchanged between a transaction processor 202, a Layer 1 blockchain 204, and a Layer 2 blockchain 206 to execute an atomic token minting transaction that bridges minted tokens from the Layer 1 blockchain to the Layer 2 blockchain. Transaction processor 202 may correspond, for example, to transaction processor 112 illustrated in FIG. 1, Layer 1 blockchain 204 may correspond, for example, to Layer 1 blockchain 122 illustrated in FIG. 1, and Layer 2 blockchain 206 may correspond, for example, to Layer 2 blockchain 124 illustrated in FIG. 1.

In this example, the atomic token minting transaction includes a plurality of operations. These operations include, for example, minting tokens on Layer 1 blockchain 204, bridging the tokens to Layer 2 blockchain 206, and depositing the minted tokens to the appropriate address on the Layer 2 blockchain 206. Generally, the atomic token minting transaction is not completed until the plurality of operations are completed, and the plurality of operations are considered, by Layer 1 blockchain 204 (e.g., the blockchain on which the transaction is initiated) part of a single, all-ornothing operation for which a single transaction fee is incurred. Because the plurality of operations are seen as, or treated as, part of a larger all-or-nothing transaction, failure of any one operation causes the entire transaction to fail.

As illustrated, to initiate an atomic token minting transaction that bridges minted tokens from Layer 1 blockchain 204 to Layer 2 blockchain 206, transaction processor 202 receives an incoming mint request 210 (e.g., from an external service that is requesting the creation of tokens on Layer 1 blockchain 204 and Layer 2 blockchain 206). Mint request 210 may generally correspond to the transaction with reference ID "1" in Tables 1 through 5 above. Generally, the mint request 210 includes information identifying a number of tokens to be minted and an address to which the tokens are to be deposited on Layer 2 blockchain 206. The mint request 210 may also include other information that can be used to annotate the atomic token minting operation, perform various authorization and authentication processes, and the like.

Based on receiving the incoming mint request 210, transaction processor 202 sends an L1 mint request 212 to Layer 1 blockchain 204 to mint a specified number of tokens on Layer 1 blockchain 204. The L1 mint request 212, as discussed above, is the initial operation of the atomic token minting transaction and may not be completed until the operations defined (e.g., by a smart contract or other enumeration of operations defining the atomic token minting transaction) are completed. To ensure that the atomic token minting transaction is not erroneously marked as completed when operations remain pending, which may leave Layer 1 blockchain 204 and Layer 2 blockchain 206 in inconsistent states, transaction processor 202 places the L1 mint request 212 in a waiting state in a tracking database until the other operations defined for the atomic token minting operation are completed.

At Layer 1 blockchain 204, upon receipt of L1 mint request 212, block 214 is executed on Layer 1 blockchain 204 to mint the number of tokens specified in L1 mint request 212. Generally, minting the tokens at block 214 creates a number of tokens to be bridged to Layer 2 blockchain 206 and triggers execution of corresponding operations on Layer 2 blockchain 206 (e.g., according to a smart contract invoked on Layer 1 blockchain 204). As illustrated, to trigger execution of the corresponding operations on Layer 2 blockchain 206, a Layer-1-to-Layer-2 bridging request 216 is forwarded from Layer 1 blockchain 204 to Layer 2 blockchain 206. The Layer-1-to-Layer-2 bridging request 216 generally indicates the number of tokens to be minted on Layer 2 blockchain 206 and the address to which the tokens are to be deposited on Layer 2 blockchain 206. To track completion of the atomic token minting transaction, in some aspects, transaction processor 202 generates a record in a tracking database for the Layer-1-to-Layer-2 bridging request 216 (corresponding to the transaction with reference ID "2" in Tables 2 through 5 above) and marks the L1 mint request 212 as dependent upon completion of the Layer-1-to-Layer-2 bridging request 216.

Subsequently, to create the corresponding tokens on Layer 2 blockchain 206, at block 218, the corresponding tokens are minted. At block 220, these tokens are deposited to the address on Layer 2 blockchain 206 specified in the Layer-1-to-Layer-2 bridging request 216. To track completion of the atomic token minting transaction, transaction processor 202 generates a record in a tracking database for the token minting operation at block 218 (corresponding to the transaction with reference ID "3" in Tables 4 through 5 above) and the token depositing operation at block 220 (corresponding to the transaction with reference ID "4" in Tables 3 through 5 above).

At block 222, transaction processor 202 detects completion of operations defined for atomically minting tokens on the L2 blockchain. To detect the completion of these operations, transaction processor 202 generally reads Layer 1 blockchain 204 and/or Layer 2 blockchain 206 and/or listens for messages emitted (e.g., broadcast to participating devices) by Layer 1 blockchain 204 and/or Layer 2 blockchain 206 referencing specific operations and confirming that these operations have been completed. Generally, completion of the atomic token minting operation may work backwards, with the latest operations being completed before earlier operations are deemed completed. As operations are completed, transaction processor 202 examines identifiers of related operations and/or transaction data (e.g., in tracking database 114), such as amount and destination address information, to link transactions and initiate the process of confirming and completing earlier operations upon completion of later operations.

Based on detecting completion of the operations for atomically minting tokens on Layer 2 blockchain 206, at block 224, transaction processor 202 marks the mint transaction as completed. Because the mint transaction is defined as an atomic transaction, and because completion of the mint transaction may be defined as predicated upon completion of an enumerated set of operations on the Layer 1 blockchain 204 and Layer 2 blockchain 206, marking the transaction as completed generally guarantees consistency between Layer 1 blockchain 204 and Layer 2 blockchain 206. That is, because the token minting operation is defined as an atomic transaction that is only completed when the enumerated set of operations are completed, when the atomic minting transaction is marked as complete, the proper number of tokens will have been minted on both Layer 1 blockchain 204 and Layer 2 blockchain 206 and deposited to the appropriate address on Layer 2 blockchain 206. As discussed, because the atomic minting transaction is marked as complete only after the enumerated set of operations are completed, consistency may be guaranteed between the records at Layer 1 blockchain 204 and Layer 2 blockchain 206, which may improve the reliability of systems that execute operations on these blockchains and minimize processing overhead involved in reconciling records across blockchains and confirming that blockchains across which the token minting transaction is bridged are consistent with each other. Further, by executing a toking minting transaction across blockchains as an atomic transaction, aspects of the present disclosure reduce the amount of compute resources involved in bridging the token minting transaction across different blockchains, as messaging need not be exchanged between the transaction processor 202 and other independent systems in order to coordinate execution of the operations involved in bridging the token minting transaction from Layer 1 blockchain 204 to Layer 2 blockchain 206.

Figure 3:
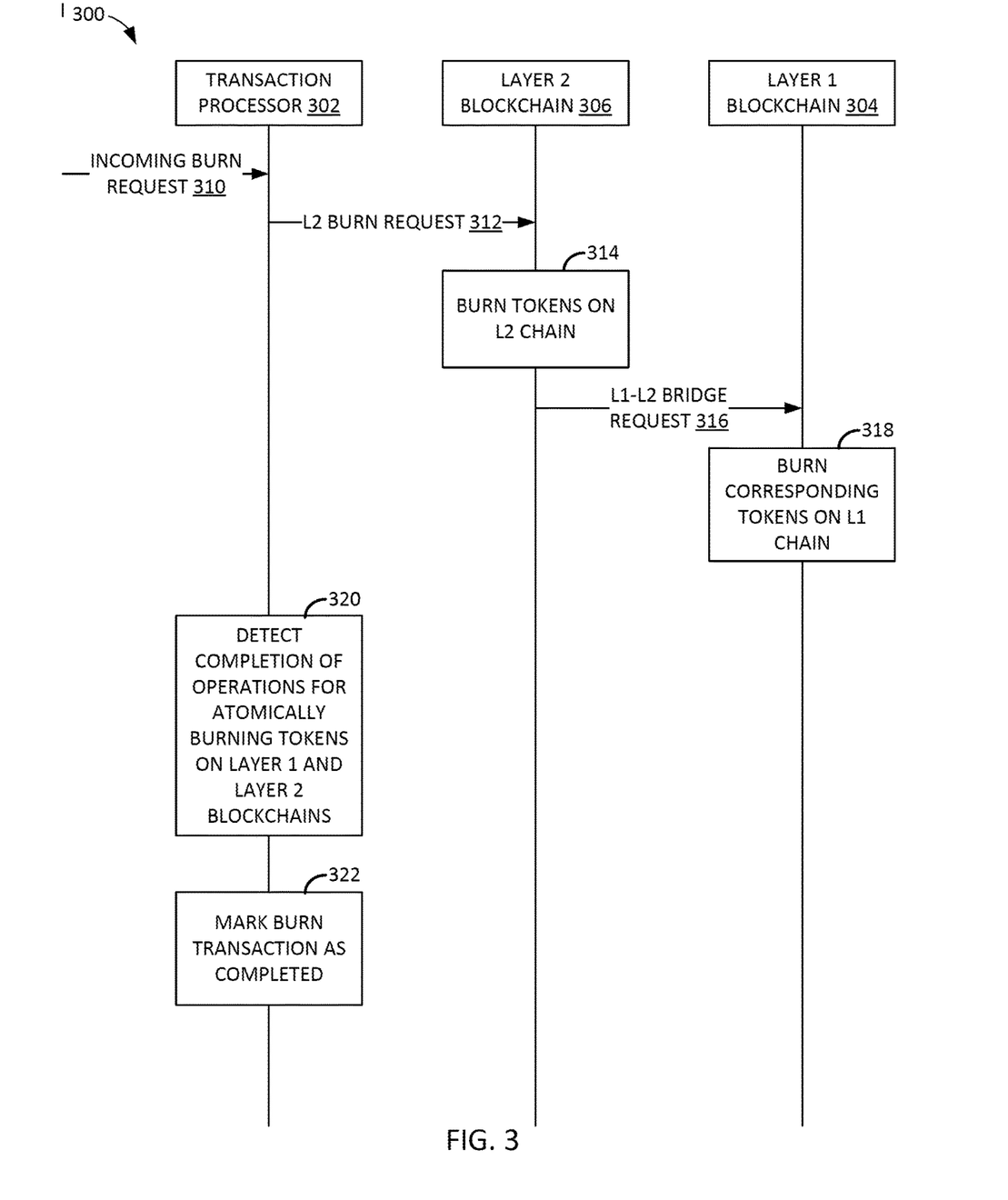
FIG. 3 is a message flow diagram illustrating messages exchanged between a transaction processor, a first blockchain, and a second blockchain for executing an atomic token burning operation that bridges a burn operation from the first blockchain to the second blockchain.

FIG. 3 is a message flow diagram illustrating messages exchanged between a transaction processor 302, Layer 1 blockchain 304, and Layer 2 blockchain 306 to execute an atomic token burning transaction that burns previously minted tokens from the Layer 1 blockchain and the Layer 2 blockchain. Transaction processor 302 may correspond, for example, to transaction processor 112 illustrated in FIG. 1, Layer 1 blockchain 304 may correspond, for example, to Layer 1 blockchain 122 illustrated in FIG. 1, and Layer 2 blockchain 306 may correspond, for example, to Layer 2 blockchain 124 illustrated in FIG. 1.

In this example, the atomic token burning transaction includes a plurality of operations. These operations include, for example, burning tokens on Layer 2 blockchain 306 and bridging the burning of these tokens to Layer 1 blockchain 304. Generally, the atomic token burning transaction is not completed until each of these operations are completed, and the operations are not considered separate operations for which separate transaction fees are incurred, but a single, all-or-nothing operation for which a single transaction fee is incurred.

As illustrated, to initiate an atomic token burning transaction that bridges token burnt from Layer 2 blockchain 306 to Layer 1 blockchain 304, transaction processor 302 receives an incoming burn request 310 (e.g., from an external service that is requesting the destruction of tokens on Layer 1 blockchain 304 and Layer 2 blockchain 306). Generally, the burn request 310 includes information identifying a number of tokens to be burnt and an address from which the tokens are to be burnt from Layer 2 blockchain 306. The burn request 310 may also include other information that can be used to annotate the atomic token burning operation, perform various authorization and authentication processes, and the like.

Based on receiving the incoming burn request 310, transaction processor 302 sends an L2 burn request 312 to Layer 2 blockchain 306 to burn a specified number of tokens on Layer 2 blockchain 306. The L2 burn request 312, as discussed above, is the initial operation of the atomic token burning transaction and may not be completed until the operations defined (e.g., by a smart contract or other enumeration of operations defining the atomic token burning transaction) are completed. To ensure that the atomic token burning transaction is not erroneously marked as completed when operations remain pending, transaction processor 302 places the record corresponding to the L2 burn request 312 (e.g., the transaction with reference ID "5" in Tables 6 through 8 above) in a waiting state in a tracking database until the other operations defined for the atomic token burning operation are completed.

At Layer 2 blockchain 306, upon receipt of L2 burn request 312, block 314 is executed on Layer 2 blockchain 304 to burn the number of tokens specified in L2 burn request 312. Generally, burning the tokens at block 314 creates a mismatch between the number of extant tokens at Layer 2 blockchain 306 and Layer 1 blockchain 304 and triggers execution of corresponding operations on Layer 1 blockchain 304. As illustrated, to trigger execution of the corresponding operations on Layer 1 blockchain 304, a Layer-1-to-Layer-2 bridging request 316 is forwarded from Layer 2 blockchain 306 to Layer 1 blockchain 304. The Layer-1-to-Layer-2 bridging request 316 generally indicates the number of tokens to be burned on Layer 1 blockchain 306 and the address from which the tokens are to be burnt from Layer 1 blockchain 304. To track completion of the atomic token burning transaction, in some aspects, transaction processor 302 generates a record in a tracking database for the Layer-1-to-Layer-2 bridging request 316 (e.g., the transaction with reference ID "6" in Tables 7 through 8 above) and marks the L2 burn request 312 as dependent upon completion of the Layer-1-to-Layer-2 bridging request 316.

Subsequently, to burn the corresponding number of tokens on Layer 1 blockchain 304 and equalize the number of extant tokens at Layer 1 blockchain 304 and Layer 2 blockchain 306, at block 318, the corresponding tokens are burned.

At block 320, transaction processor 302 detects completion of operations defined for atomically burning tokens on the Layer 1 and Layer 2 blockchains. To detect the completion of these operations, transaction processor 302 generally reads Layer 1 blockchain 304 and/or Layer 2 blockchain 306 and/or listens for messages emitted (e.g., broadcast to participating devices) by Layer 1 blockchain 304 and/or Layer 2 blockchain 306 referencing specific operations and confirming that these operations have been completed. Generally, determining that the atomic token burning operation is completed may work backwards, with the token unbridge operation being marked as completed in a tracking database (e.g., tracking database 114) before the token burn operation on Layer 2 blockchain 306 is deemed completed. As operations are completed, transaction processor 302 examines identifiers of related operations and/or transaction data, such as amount and destination address information, to link transactions and initiate the process of confirming and completing earlier operations upon completion of later operations.

Based on detecting completion of the operations for atomically burning tokens on Layer 1 blockchain 304 and Layer 2 blockchain 306, at block 322, transaction processor 302 marks the burn transaction as completed. Because the burn transaction is defined as an atomic transaction, and because completion of the burn transaction may be defined as predicated upon completion of an enumerated set of operations on the Layer 1 blockchain 304 and Layer 2 blockchain 306, marking the transaction as completed generally guarantees consistency between Layer 1 blockchain 204 and Layer 2 blockchain 206. That is, because the token burning operation is defined as an atomic transaction that is only completed when the enumerated set of operations are completed, when the atomic burning transaction is marked as complete, the proper number of tokens will have been burned on both Layer 1 blockchain 304 and Layer 2 blockchain 306, and the number of extant tokens post-burn on each of Layer 1 blockchain 304 and Layer 2 blockchain 306 will be less than the number of extant tokens prior to receipt of burn request 310 and completion of the atomic token burning transaction. As discussed, because the atomic burning transaction is marked as complete only after the enumerated set of operations are completed, consistency may be guaranteed between the records at Layer 1 blockchain 304 and Layer 2 blockchain 306, which may improve the reliability of systems that execute operations on these blockchains and minimize processing overhead involved in reconciling records across blockchains and confirming that blockchains across which a transaction is bridged are consistent with each other. Further, by executing a token burn transaction across blockchains as an atomic transaction, aspects of the present disclosure reduce the amount of compute resources involved in bridging transactions across different blockchains, as messaging need not be exchanged between the transaction processor 302 and other independent systems in order to coordinate execution of the operations involved in bridging the token burn transaction from Layer 1 blockchain 304 to Layer 2 blockchain 306.

Figure 4:
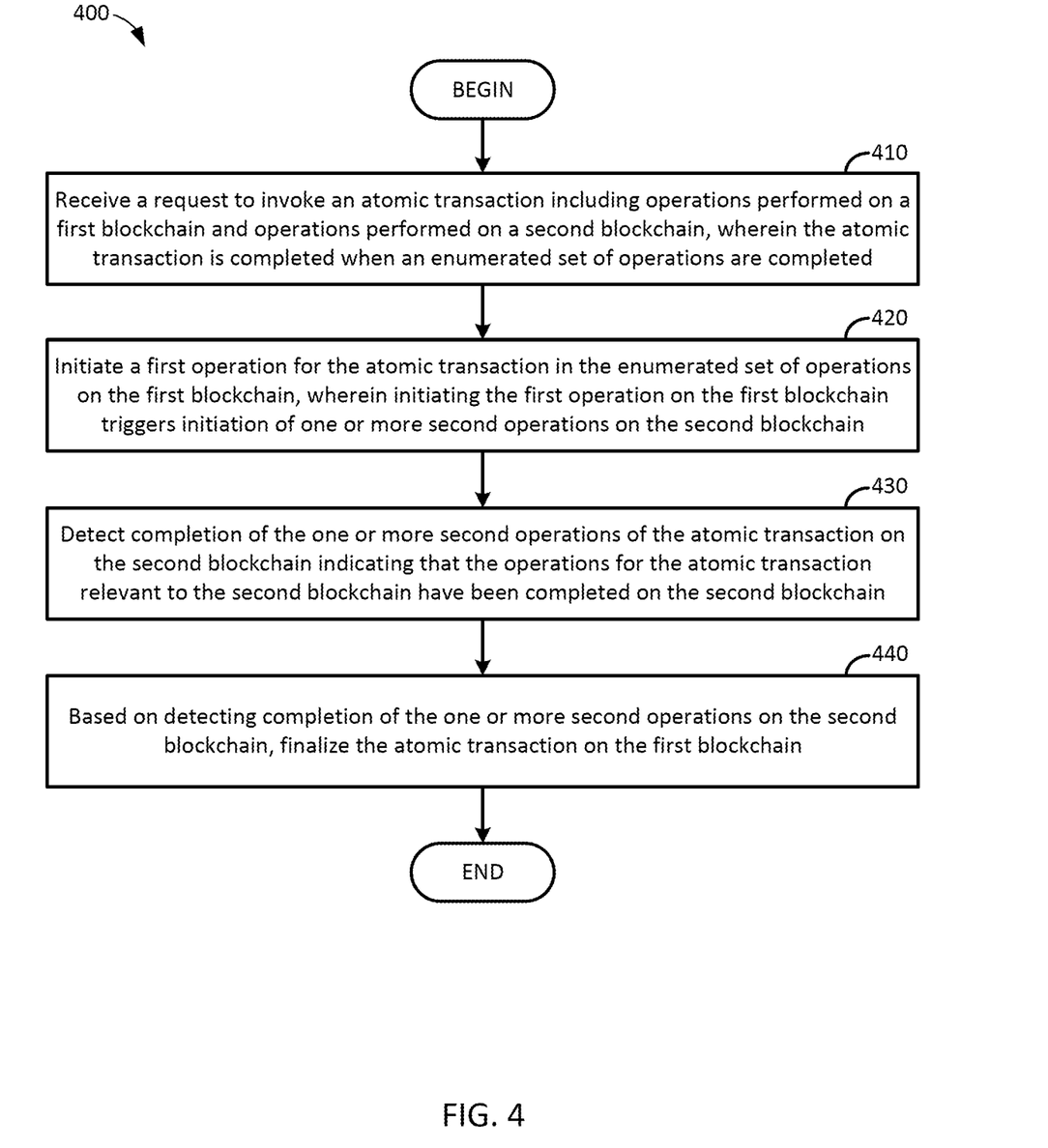
FIG. 4 illustrates example operations for bridging a transaction across a first blockchain and a second blockchain using atomic transactions.

Example Operations for Atomic Transaction Bridging Across a First Blockchain and a Second Blockchain FIG. 4 illustrates example operations 400 for atomic transaction bridging across a first blockchain and a second blockchain, such as Layer 1 blockchain 122 and Layer 2 blockchain 124 illustrated in FIG. 1, Layer 1 blockchain 204 and Layer 2 blockchain 206 illustrated in FIG. 2, and/or Layer 1 blockchain 304 and Layer 2 blockchain 306 illustrated in FIG. 3. Operations 400 may be performed, for example, by a transaction processing system 110 illustrated in FIG. 1 or other processing system that can coordinate transactions between a first blockchain and a second blockchain (e.g., between a Layer 1 blockchain and a Layer 2 blockchain, or vice versa).

As illustrated, operations 400 begins at block 410 with receiving a request to invoke an atomic transaction. Generally, the atomic transaction includes operations performed on a first blockchain and operations performed on a second blockchain, and the atomic transaction is considered completed when an enumerated set of operations (on the first blockchain and the second blockchain) are completed.

In some aspects, the enumerated set of operations may be enumerated in a smart contract defining the atomic transaction. The smart contract may be, for example, a smart contract defined at a Layer 1 blockchain (e.g., an ETHEREUM® network or other cryptocurrency network that supports smart contracts).

In some aspects, the request to invoke the atomic transaction may be a request to generate a token on the first blockchain according to a defined format. For example, where the Ethereum® network serves as the Layer 1 blockchain upon which a Layer 2 blockchain is overlaid, the request to invoke the atomic transaction may be a request to generate a token that complies with the Ethereum® Request for Comment (ERC)-20 predicate. The ERC-20 predicate generally defines a set of functions that the token is required to implement to allow the token to be integrated with other contracts, marketplaces, wallets, or other compute resources that can perform transactions using these tokens.

At block 420, operations 400 proceed with initiating a first operation for the atomic transaction in the enumerated set of operations on the first blockchain. Generally, initiating the first operation on the first blockchain triggers initiation of one or more second operations on the second blockchain.

At block 430, operations 400 proceed with detecting completion of the one or more second operations of the atomic transaction on the second blockchain. Generally, completion of the one or more second operations indicates that operations for the atomic transaction relevant to the second blockchain have been completed on the second blockchain, and remaining operations for the atomic transaction on the first blockchain may be executed and/or confirmed and completed on the first blockchain.

In some aspects, initiating the first operation for the atomic transaction includes writing an entry including parameters of the first operation, an identifier of the first operation, and an indication that the first operation is waiting for completion of the one or more second operations to a tracking database. As discussed above, entries in the tracking database generally allow for a transaction processor to link operations that may not explicitly be marked as related operations and allow for operations to be marked as operations that are not to be completed until the related operations are completed. To detect completion of the one or more second operations, the transaction processor matches one or more parameters in an entry in the tracking database for an operation of the one or more second operations for the atomic transaction to one or more corresponding parameters of the first operation. For example, the matching parameters may be reference identifiers associated with the first operation and the one or more second operations. For example, the matching parameters may include a destination address and an amount associated with the transaction, as illustrated by the bridge and deposit transactions in Table 5 illustrated above. In some aspects, where the first operation is not explicitly associated with one of the second operations, the first operation and one of the second operations may be matched based on other information, such as an amount parameter, destination address parameter, or other parameters associated with the first operation and the one or more second operations.

At block 440, operations 400 proceed with finalizing the atomic transaction on the first blockchain based on detecting completion of the one or more second operations on the second blockchain.

In some aspects, the first blockchain may be a Layer 1 blockchain (e.g., an ETHEREUM® blockchain), and the second blockchain may be a Layer 2 blockchain (e.g., the POLYGON® blockchain) overlaid on the Layer 1 blockchain. The atomic transaction may include a transaction to mint tokens on the Layer 2 blockchain. In such a case, initiating the first operation for the atomic transaction may include initiating a token minting operation on the Layer 1 blockchain. This may, in turn, trigger execution of one or more operations to bridge the token minting operation on the Layer 1 blockchain to the Layer 2 blockchain. The one or more operations to bridge the token minting operation on the Layer 1 blockchain to the Layer 2 blockchain generally includes a transaction to deposit tokens from an address on the Layer 1 blockchain to an address on the Layer 2 blockchain and a sweep operation on the Layer 2 blockchain to confirm that the tokens have been deposited in the address on the Layer 2 blockchain.

In some aspects, the first blockchain may be a Layer 2 blockchain, and the second blockchain may be a Layer 1 blockchain. The atomic transaction may include a transaction to burn tokens on the Layer 2 blockchain. In such a case, initiating the first operation for the atomic transaction may include initiating a token burn operation on the Layer 2 blockchain. This may, in turn, trigger execution of one or more operations to bridge the token burn operation on the Layer 2 blockchain to the Layer 1 blockchain. The one or more operations to bridge the token burn operation generally includes a transaction to cancel corresponding tokens on the Layer 1 blockchain.

Figure 5:
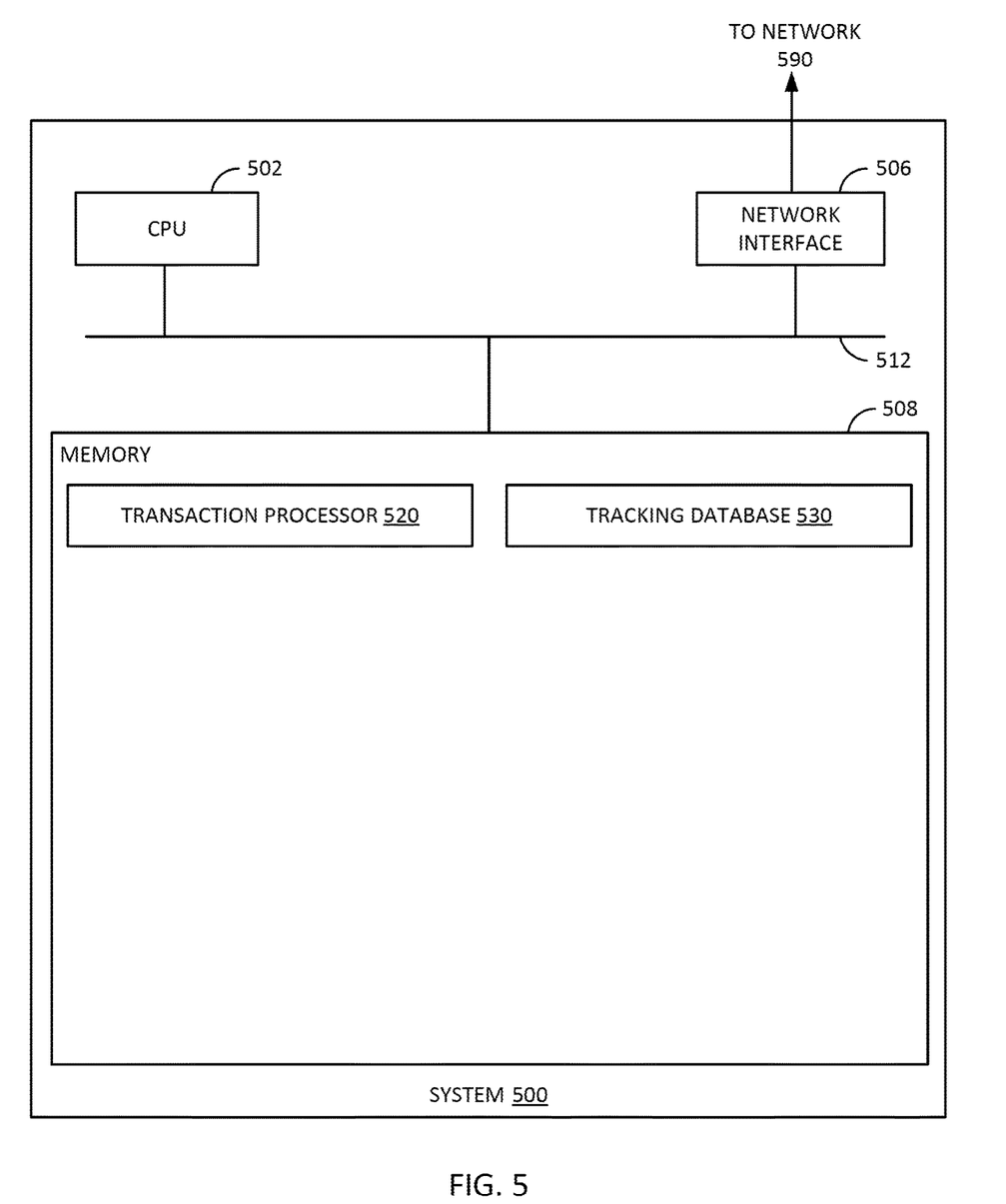
FIG. 5 illustrates an example system on which embodiments of the present disclosure can be performed.

Example System for Atomic Transaction Bridging Across a First Blockchain and a Second Blockchain FIG. 5 illustrates an example system 500 configured to perform the methods described herein, including, for example, operations 200 of FIG. 2, operations 300 of FIG. 3, and/or operations 400 of FIG. 4. In some embodiments, system 500 may act as a transaction processing system through which transactions are bridged across a Layer 1 blockchain and a Layer 2 blockchain, such as transaction processing system 110 illustrated in FIG. 1.

As shown, system 500 includes a central processing unit (CPU) 502, network interface 506 through which system 500 is connected to network 590 (which may be a local network, an intranet, the internet, or any other group of computing devices communicatively connected to each other), a memory 508, and an interconnect 512. The network interface 506 may be used to receive requests to bridge transactions across different blockchains, such as a Layer 1 blockchain and a Layer 2 blockchain (e.g., as depicted and described with respect to FIGS. 1 through 3.

CPU 502 may retrieve and execute programming instructions stored in the memory 508. Similarly, the CPU 502 may retrieve and store application data residing in the memory 508. The interconnect 512 transmits programming instructions and application data, among the CPU 502, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a transaction processor 520 and tracking database 530.

Transaction processor 520 generally corresponds to transaction processor 112 illustrated in FIG. 1. Generally, transaction processor 520 receives requests to invoke atomic transactions on a first blockchain (which may correspond to Layer 1 blockchain 122 illustrated in FIG. 1) and a second blockchain (which may correspond to Layer 2 blockchain 124 illustrated in FIG. 1). These requests may specify, for example, a set of operations to be completed in order to execute an atomic transaction across a first blockchain and a second blockchain, such as a token minting transaction, a token burning transaction, or other transactions in which consistency between a first blockchain and a second blockchain is to be maintained. To execute the atomic transaction, transaction processor 520 invokes a first operation of the enumerated set of operations for the atomic transaction on the first blockchain (e.g., by transmitting one or more messages to the first blockchain via network interface 506), which triggers execution of corresponding operations on one or both of the first blockchain and the second blockchain. When transaction processor 520 detects that the other operations in the enumerated set of operations are complete (e.g., receives messaging, via network interface 506, from the first blockchain and/or second blockchain indicating that these operations are complete), transaction processor 520 completes the first operation to finalize the atomic transaction.

Tracking database 530 generally corresponds to tracking database 114 illustrated in FIG. 1. Generally, tracking database 530 maintains records of the transactions performed on the first blockchain and the second blockchain. These records are generated, maintained, and updated by transaction processor 520 based on records read from the first blockchain and/or the second blockchain and/or messaging emitted by the first blockchain and/or the second blockchain to track completion of the operations defined for an atomic transaction. As operations are marked as completed in tracking database 530, earlier operations that depend on the completed operations may be processed by transaction processor 520 and the appropriate blockchain (e.g., the first blockchain and/or the second blockchain).

EXAMPLE CLAUSES

Implementation details for various aspects of the present disclosure are described in the following numbered clauses.

Clause 1: A method, comprising: receiving a request to invoke an atomic transaction including operations performed on a first blockchain and operations performed on a second blockchain, wherein the atomic transaction is completed when an enumerated set of operations are completed; initiating a first operation for the atomic transaction in the enumerated set of operations on the first blockchain, wherein initiating the first operation on the first blockchain triggers initiation of one or more second operations for the atomic transaction on the second blockchain; detecting completion of the one or more second operations for the atomic transaction on the second blockchain indicating that operations for the atomic transaction relevant to the second blockchain have been completed on the second blockchain; and based on detecting completion of the one or more second operations on the second blockchain, finalizing the atomic transaction on the first blockchain.

Clause 2: The method of Clause 1, wherein the enumerated set of operations are enumerated in a smart contract defining the atomic transaction.

Clause 3: The method of any one of Clauses 1 or 2, wherein the request to invoke the atomic transaction comprises a request to generate a token on the first blockchain.

Clause 4: The method of any one of Clauses 1 through 3, wherein initiating the first operation for the atomic transaction on the first blockchain comprises writing, to a tracking database, an entry including parameters of the first operation, an identifier of the first operation, and an indication that the first operation is waiting for completion of the one or more second operations for the atomic transaction.

Clause 5: The method of Clause 4, wherein detecting completion of the one or more second operations for the atomic transaction comprises matching one or more parameters in an entry in the tracking database for an operation of the one or more second operations for the atomic transaction to one or more corresponding parameters of the first operation.

Clause 6: The method of any one of Clauses 1 through 5, wherein the first blockchain comprises a Layer 1 blockchain and the second blockchain comprises a Layer 2 blockchain.

Clause 7: The method of Clause 6, wherein the atomic transaction comprises a transaction to mint tokens on the Layer 2 blockchain.

Clause 8: The method of Clause 7, wherein initiating the first operation for the atomic transaction comprises initiating a token minting operation on the Layer 1 blockchain.

Clause 9: The method of Clause 8, wherein: initiating the token minting operation on the Layer 1 blockchain triggers execution of one or more operations to bridge the token minting operation on the Layer 1 blockchain to the Layer 2 blockchain, and the one or more operations to bridge the token minting operation on the Layer 1 blockchain to the Layer 2 blockchain comprise a transaction to deposit tokens from an address on the Layer 1 blockchain to an address on the Layer 2 blockchain and a sweep operation on the Layer 2 blockchain to confirm that the tokens have been deposited in the address on the Layer 2 blockchain.

Clause 10: The method of any one of Clauses 1 through 5, wherein the first blockchain comprises a Layer 2 blockchain and the second blockchain comprises a Layer 1 blockchain.

Clause 11: The method of Clause 10, wherein the atomic transaction comprises a transaction to burn tokens on the Layer 2 blockchain.

Clause 12: The method of Clause 11, wherein initiating the first operation for the atomic transaction comprises initiating a token burn operation on the Layer 2 blockchain.

Clause 13: The method of Clause 12, wherein: initiating the token burn operation on the Layer 2 blockchain triggers execution of one or more operations to bridge the atomic transaction to the Layer 1 blockchain, and the one or more operations comprise a transaction to cancel corresponding tokens on the Layer 1 blockchain.

Clause 14: A system, comprising: a memory having executable instructions stored thereon; and a processor configured to execute the executable instructions to perform the operations of any one of Clauses 1 through 13.

Clause 15: A system, comprising: means for performing the operations of any one of Clauses 1 through 13.

Clause 16: A computer-readable medium having instructions stored thereon which, when executed by a processor, performs the operations of any one of Clauses 1 through 13.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a request to invoke an atomic transaction including operations performed on a first blockchain and operations performed on a second blockchain, wherein the atomic transaction is completed when an enumerated set of operations are completed;
   initiating a first operation for the atomic transaction in the enumerated set of operations on the first blockchain, wherein initiating the first operation on the first blockchain triggers initiation of one or more second operations for the atomic transaction on the second blockchain;
   detecting completion of the one or more second operations for the atomic transaction on the second blockchain indicating that operations for the atomic transaction relevant to the second blockchain have been completed on the second blockchain; and
   based on detecting completion of the one or more second operations on the second blockchain, finalizing the atomic transaction on the first blockchain.

2. The method of claim 1, wherein the enumerated set of operations are enumerated in a smart contract defining the atomic transaction.

3. The method of claim 1, wherein the request to invoke the atomic transaction comprises a request to generate a token on the first blockchain.

4. The method of claim 1, wherein initiating the first operation for the atomic transaction on the first blockchain comprises writing, to a tracking database, an entry including parameters of the first operation, an identifier of the first operation, and an indication that the first operation is waiting for completion of the one or more second operations for the atomic transaction.

5. The method of claim 4, wherein detecting completion of the one or more second operations for the atomic transaction comprises matching one or more parameters in an entry in the tracking database for an operation of the one or more second operations for the atomic transaction to one or more corresponding parameters of the first operation.

6. The method of claim 1, wherein the first blockchain comprises a Layer 1 blockchain and the second blockchain comprises a Layer 2 blockchain.

7. The method of claim 6, wherein the atomic transaction comprises a transaction to mint tokens on the Layer 2 blockchain.

8. The method of claim 7, wherein initiating the first operation for the atomic transaction comprises initiating a token minting operation on the Layer 1 blockchain.

9. The method of claim 8, wherein:
   initiating the token minting operation on the Layer 1 blockchain triggers execution of one or more operations to bridge the token minting operation on the Layer 1 blockchain to the Layer 2 blockchain, and
   the one or more operations to bridge the token minting operation on the Layer 1 blockchain to the Layer 2 blockchain comprise a transaction to deposit tokens from an address on the Layer 1 blockchain to an address on the Layer 2 blockchain and a sweep operation on the Layer 2 blockchain to confirm that the tokens have been deposited in the address on the Layer 2 blockchain.

10. The method of claim 1, wherein the first blockchain comprises a Layer 2 blockchain and the second blockchain comprises a Layer 1 blockchain.

11. The method of claim 10, wherein the atomic transaction comprises a transaction to burn tokens on the Layer 2 blockchain.

12. The method of claim 11, wherein initiating the first operation for the atomic transaction comprises initiating a token burn operation on the Layer 2 blockchain.

13. The method of claim 12, wherein:
   initiating the token burn operation on the Layer 2 blockchain triggers execution of one or more operations to bridge the atomic transaction to the Layer 1 blockchain, and
   the one or more operations comprise a transaction to cancel corresponding tokens on the Layer 1 blockchain.

14. A system, comprising:
   a memory having executable instructions stored thereon; and
   a processor configured to execute the executable instructions to cause the system to:
      receive a request to invoke an atomic transaction including operations performed on a first blockchain and operations performed on a second blockchain, wherein the atomic transaction is completed when an enumerated set of operations are completed;

initiate a first operation for the atomic transaction in the enumerated set of operations on the first blockchain, wherein initiating the first operation on the first blockchain triggers initiation of one or more second operations for the atomic transaction on the second blockchain;

detect completion of the one or more second operations for the atomic transaction on the second blockchain indicating that operations for the atomic transaction relevant to the second blockchain have been completed on the second blockchain; and based on detecting completion of the one or more second operations on the second blockchain, finalize the atomic transaction on the first blockchain.

15. The system of claim 14, wherein in order to initiate the first operation for the atomic transaction on the first blockchain, the processor is configured to cause the system to write, to a tracking database, an entry including parameters of the first operation, an identifier of the first operation, and an indication that the first operation is waiting for completion of the one or more second operations for the atomic transaction.

16. The system of claim 15, wherein in order to detect completion of the one or more second operations for the atomic transaction, the processor is configured to cause the system to match one or more parameters in an entry in the tracking database for an operation of the one or more second operations for the atomic transaction to one or more corresponding parameters of the first operation.

17. The system of claim 14, wherein:
the first blockchain comprises a Layer 1 blockchain,
the second blockchain comprises a Layer 2 blockchain,
the atomic transaction comprises a transaction to mint tokens on the Layer 2 blockchain,
in order to initiate the first operation for the atomic transaction, the processor is configured to initiate a token minting operation on the Layer 1 blockchain that triggers execution of one or more operations to bridge the token minting operation on the Layer 1 blockchain to the Layer 2 blockchain, and
the one or more operations to bridge the token minting operation on the Layer 1 blockchain to the Layer 2 blockchain comprise a transaction to deposit tokens from an address on the Layer 1 blockchain to an address on the Layer 2 blockchain and a sweep operation on the Layer 2 blockchain to confirm that the tokens have been deposited in the address on the Layer 2 blockchain.

18. The system of claim 14, wherein:
the first blockchain comprises a Layer 2 blockchain,
the second blockchain comprises a Layer 1 blockchain,
the atomic transaction comprises a transaction to burn tokens on the Layer 2 blockchain,
in order to initiate the first operation for the atomic transaction, the processor is configured to initiate a token burn operation on the Layer 2 blockchain that triggers execution of one or more operations to bridge the atomic transaction to the Layer 1 blockchain, and
the one or more operations comprise a transaction to cancel corresponding tokens on the Layer 1 blockchain.

19. The system of claim 14, wherein the enumerated set of operations are enumerated in a smart contract defining the atomic transaction.

20. A non-transitory computer-readable medium having instructions stored thereon which, when executed by a processor, performs an operation comprising:
receiving a request to invoke an atomic transaction including operations performed on a first blockchain and operations performed on a second blockchain, wherein the atomic transaction is completed when an enumerated set of operations are completed;

initiating a first operation for the atomic transaction in the enumerated set of operations on the first blockchain, wherein initiating the first operation on the first blockchain triggers initiation of one or more second operations for the atomic transaction on the second blockchain;

detecting completion of the one or more second operations for the atomic transaction on the second blockchain indicating that operations for the atomic transaction relevant to the second blockchain have been completed on the second blockchain; and based on detecting completion of the one or more second operations on the second blockchain, finalizing the atomic transaction on the first blockchain.

* * * * *